United States Patent

[11] 3,551,646

| [72] | Inventor | Paul V. Harmon |
| | | Nashville, Tenn. |
| [21] | Appl. No. | 823,806 |
| [22] | Filed | May 12, 1969 |
| [45] | Patented | Dec. 29, 1970 |
| [73] | Assignee | Precision Parts Corporation |
| | | Nashville, Tenn. |
| | | a corporation of Tennessee |

[54] DEMAND-LIMITING ELECTRICAL HEATING SYSTEM
8 Claims, 4 Drawing Figs.

| [52] | U.S. Cl. | 219/485, 219/486 |
| [51] | Int. Cl. | H05b 1/02 |
| [50] | Field of Search | 219/485, 486 |

[56] References Cited
UNITED STATES PATENTS

| 2,825,791 | 3/1958 | Jackson | 219/486 |
| 3,215,348 | 11/1965 | Nelson et al. | 219/486 |
| 3,351,739 | 11/1967 | Eckman | 219/486 |

Primary Examiner—Bernard A. Gilheany
Assistant Examiner—F. E. Bell
Attorney—John X. Phillips ABSTRACT: A demand-limiting control for electrical space-heating systems of the modulating type in which the number of heaters brought into action is controlled by stepwise progressive energization thereof; the control provides individually adjustable upper limits for the number of heaters energized for each of several sub ranges of outside air temperature, so that the instantaneous electrical power demand cannot exceed a level appropriate to the anticipated need for heat buildup.

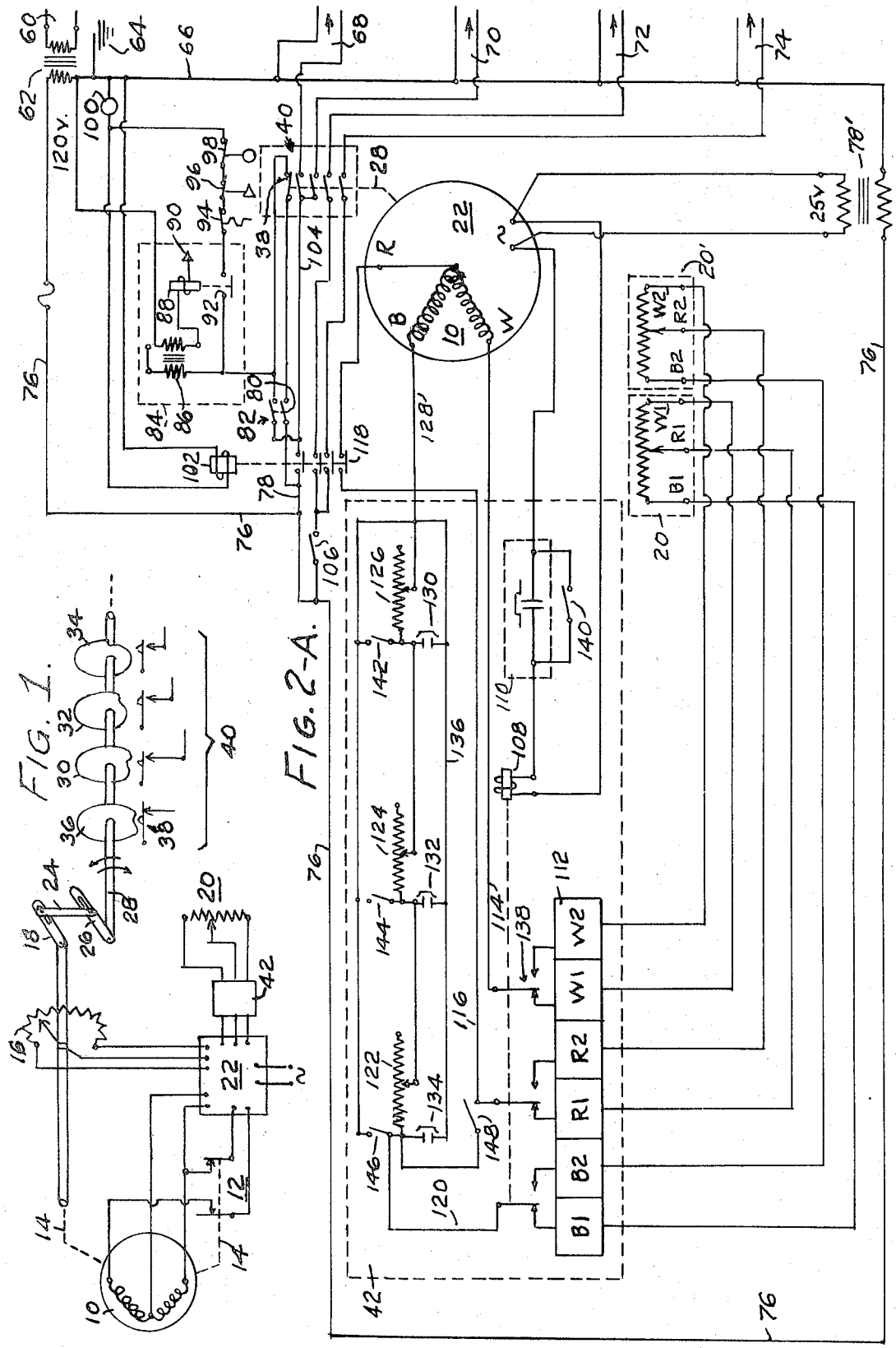

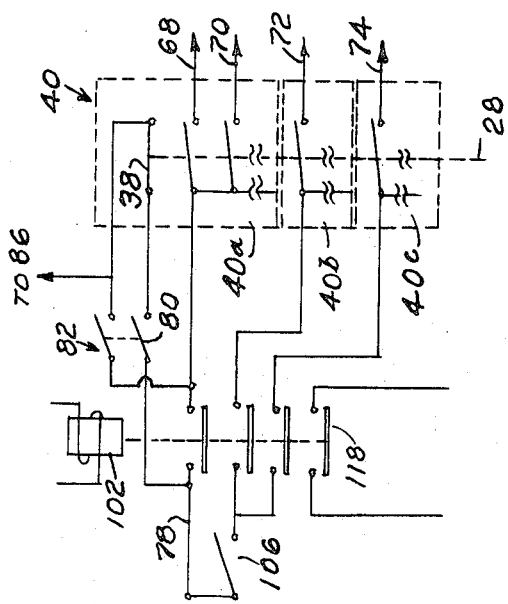
FIG. 3.
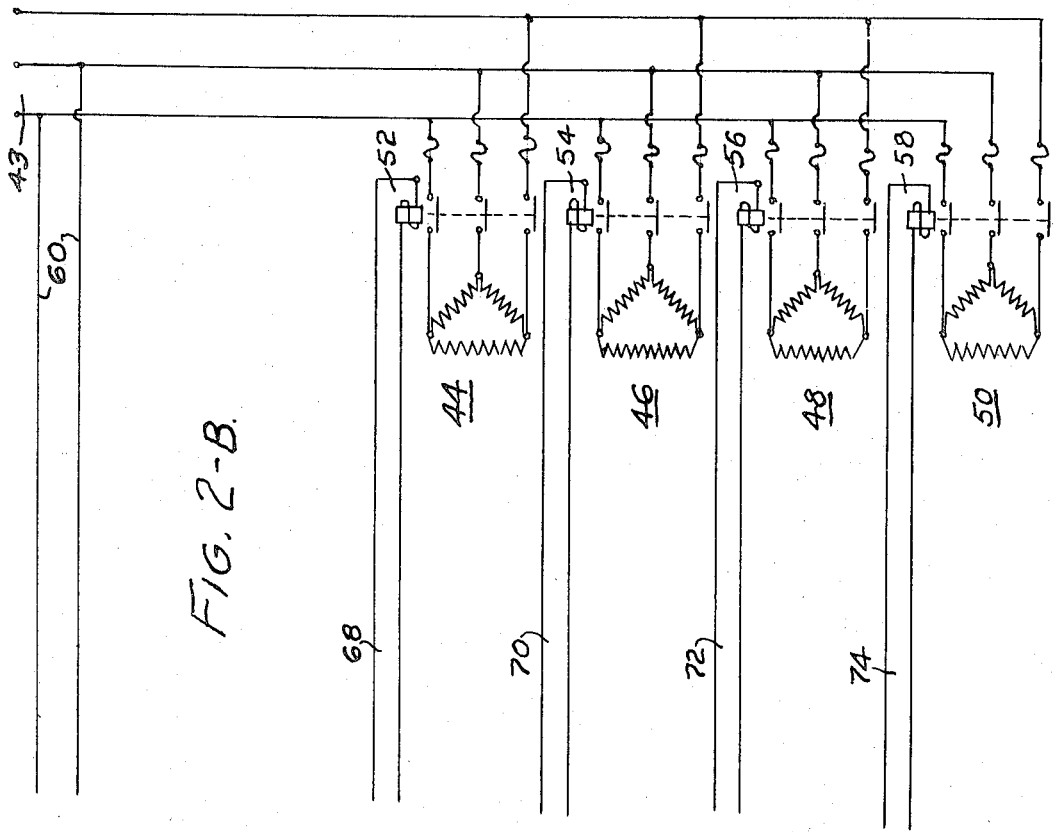
FIG. 2-B.

DEMAND-LIMITING ELECTRICAL HEATING SYSTEM

BACKGROUND OF THE INVENTION

Large capacity space heating systems are usually controlled, as known in the art, by bringing into action a selected number of heaters or heat sources (fuel burners, electrical strip or bar heaters, et cetera), in accordance with the temperature of the heat transfer medium (water, steam or air), with or without an added control effect derived from the ambient temperature outside of the heated space or building. It is fundamental that the maintenance of an adequate temperature (above that of the outside air) within any particular building, and at any given time, will require a certain expenditure of heat units derived from the fuel, the electrical supply, or whatever. In the case of electrically heated buildings, however, the cost of these heat units depends not only on the total kilowatt-hour (or BTU) consumption, but also on the instantaneous or short-term rate of consumption or "demand." Electrical power utilities charge a significantly higher tariff, or penalty, for power requirements that exceed, even momentarily, specified levels. It is, therefore, unnecessarily costly to utilize the maximum power capacity of an electrical-heating system merely to make interim upward adjustments in the temperature of the heat transfer medium. This is especially true when the demand for heat results from only a small drop in temperature, as is usually true in mild climates, or after weekend shutdowns or the like. It is moreover, only very rarely indeed that anything like the full power of a large electrical-heating system is required in order to makeup losses to the ambient atmosphere. Prior control systems are very deficient in not permitting the rate of consumption of electricity to be "tailored" to fit local conditions of climate and building management.

SUMMARY OF THE INVENTION

The electrical-heating control system disclosed herein meets the foregoing requirements by superimposing upon the known-type of control system (having a plurality of electrical heaters, and having means for energizing them in response to temperature signals), a modulating range control which limits the maximum instantaneous power demand to a value which is appropriate to the anticipated need for heat additions. Thus, the system provides a plurality of subranges (typically of the outside air temperature) each having its own demand limit, to the end that the larger rates of power consumption will only be called for in case of actual need for such rates to make up losses; i.e., during periods of more severe weather.

In a preferred and exemplary embodiment of the invention to be described herein, a known-type of servocontrol motor is employed to actuate, in sequence, a series of contacts which, through contactors of the electromagnetic type, progressively energize the electrical-heating elements. These elements will ordinarily be at least three in number, and may be considerably more numerous. The number of heating elements energized depends upon the setting of a controller such as a control potentiometer whose setting controls the operation of a balancing relay that energizes a reversible motor in the servocontrol assembly. The servo (followup) motor progressively energizes (by cams on its shaft which operate cam controlled switches) the respective supply line contactors of the several heating elements (or progressively deenergizes them) by effecting a bridge comparison between the setting of the control potentiometer and the settling of a similar potentiometer whose movable contact is positioned by the same motor shaft. This type of followup or servocontrol is well-known in the heating field.

Heretofore, and as suggested above, the servocontrol has been responsive to a "signal" (e.g. a control potentiometer setting) capable of driving the servomotor through its full range of contact-control travel. When the control potentiometer, as is often the case, merely senses the temperature of the heat transfer medium (hot water or steam), a drop in that temperature will quite commonly drive the servomotor far enough to energize a considerable number, or even all, of the heaters, producing heavy electrical demand with consequent penalty charges, which are in no way compensated or mitigated when the load is ultimately cut back as the temperature of the fluid medium approaches the desired set point.

The new system of the present invention continues to sense the temperature of the heat transfer medium, as above, or a combination of that parameter and the temperature of the ambient (outside) air, but includes a set of at least 3 limit-modulating range-setting resistors which are individually adjustable and are in effect connected between the control potentiometer and the servomotor in a series string. A respective thermally sensitive switch is provided for each of these resistors, these switches being preferably arranged to sense outside air temperature within at least 3 subranges, and upon operation to short circuit the corresponding range-setting resistors. Thus, only when the outside temperature is in the lowest subrange are the artificial or "false" signal producing range-setting resistors shorted out of their modulating series circuit between the controller and servo or step motor. At any higher outside temperature, the step motor is effectively restrained from energizing all of the heating elements, the number being energized for each subrange of temperatures depending upon the selective (manual) presetting of the modulating or range-setting resistors.

Provision is also made for artificially shorting out the range-setting resistors, and for artificially simulating an extreme setting of the control potentiometer, to enable convenient calibration and setting of the circuit components during installation, or later, so as to bring into action the desired number of heating elements for the various subranges of sensed outside temperature (and temperature of the heat-exchange medium), and provisions for the usual safety interlocks of boiler operation are of course included. Also, the novel circuitry includes a return-to-off control for resetting of the servo step motor in the event of a power interruption or shutdown due to failure of a safety interlock, whereby to prevent a "slam" load on the power supply lines when the power is restored. That is, the previous pattern of heaters-to-be-energized is again achieved only by progressive application of line power to them in turn.

The objects of the invention are thus attained by a novel combination of control components of known kinds, which combination is basically simple and inexpensive considering the novel results obtained by the invention, and the operational and economic benefits which follow from its use.

BRIEF DESCRIPTION OF THE DRAWINGS

FIG. 1 is a schematic diagram of a generally known-type of heater controller, showing also the functional relation thereto of the improvements of the present invention.

FIG. 2 is a circuit diagram of a complete system in accordance with the invention, this FIG. being divided, for clarity, between two sheets of the drawing, and the parts of the FIG. labeled FIG. 2–A and 2–B.

FIG. 3 is an enlarged view of a portion of FIG. 2–A.

DESCRIPTION OF THE PREFERRED EMBODIMENT

While the invention is not limited to the use of any particular kinds of control equipment, ready understanding by those skilled in the art will be facilitated by an explanation of the system aspects in terms of particular control components with which the art is familiar. FIG. 1 of the drawings illustrates a well-known type of modulating followup motor controller (such as the Honeywell-type M 904E modulating motor) connected by linkage to a commercial step-type of progressive contact making assembly (such as the Honeywell-type S 435 step controller). Typical construction and wiring of the modulating motor unit are shown in numerous U.S. Pats., such as Taylor 2,028,110, Edmondson 2,127,680, and Steinfeld 2,196,687, to which reference may be made for details of circuitry and construction. The Steinfeld patent in particular, shows such a modulating motor connected to operate a step-type of contact-making assembly.

Briefly, a followup motor of this type comprises a reversible AC motor 10 (FIG. 1) geared down to produce slow shaft rotation, usually between limits of less than a half turn, established by a pair of limit switches 12 driven from a cam or arm on the motor shaft 14, which also carries the wiper arm contact of a potentiometer resistance 16, and an arm 18 forming part of a linkage providing a mechanical output drive. A condition-responsive position controller potentiometer 20 is connected electrically to one set of input terminals of a balancing relay 22, and the potentiometer 16 is connected to the other set of input terminals of the relay. In operation, the balancing relay energizes the appropriate directional winding of motor 10 to cause the shaft 14 to takeup a position at which the setting of potentiometer 16 agrees with that called for by control potentiometer 20, in the usual manner of followup servos. Control potentiometer 20 may be set by a bellows linkage sensitive to temperature, pressure or other condition to be sensed, or combination of such conditions.

The output shaft 14 of motor 10 has its arm 18 connected, as by a ball joint link 24, to an arm 26 of a shaft 28 forming part of a step circuit controller 40. Shaft 28 typically carries a series of cams 30, 32, 34 et cetera, which, during rotation of the shaft, close corresponding microswitches or the like to complete external circuits. To define a reset position, typically when all the other cams are in open-circuit condition, a reset cam 36 may be arranged to open a microswitch 38 which is connected in a motor-homing control circuit in the known manner.

The added apparatus required for a typical system incorporating the present invention is indicated merely schematically, in FIG. 1, as a block 42 inserted functionally between the controller 20 and the relay 22. The nature of these additions will now be described, in connection with FIGS. 2-A and 2-B of the drawings.

CONTROL CIRCUITRY IN GENERAL

Referring first to FIG. 2-B, numeral 43 indicates by way of example a three-wire, three-phase AC supply, ordinarily of 230, 480 volt or higher value supplying the premises and the electrical-heating plant. A plurality of resistive immersion heaters 44, 46, 48 and 50 may be connected across these supply mains by contactors operated by relay magnets 52, 54, 56 and 58. One pair of the supply conductors are extended over leads 60 to supply the stepdown transformer 62 (FIG. 2-A) for the control system. This same lower control voltage will ultimately be returned to the contactor magnets 52—58 to regulate the application of heating power to the boiler or water heater of the system.

Turning now to FIG. 2-A, the leads 60 extend to the transformer 62 reducing the supply voltage to a nominal value, such as 120 volts AC, one side being "grounded" as at 64 to a common conductor 66 to which one conductor of the contactor magnets is also connected, these circuits being designated by numerals 68, 70, 72 and 74. It will be understood by those familiar with such installations that the showing of four contactors, and four 3-phase sets of heaters 44—60, is merely exemplary, as in larger installations a considerably larger number of heaters will be employed. The delta connection of the 3-phase heaters is also merely by way of example.

The secondary (low voltage, e.g., 120-volt) circuit or transformers 62 also energizes a conductor 76 leading to the control apparatus of the invention, and in particular through the primary winding of a further stepdown transformer 78' providing for example 24 volts AC for the followup motor system. By means of an interlock to be described below, the arrangement is such that, in the event of a power failure, and subsequent restoration, the followup motor will first have to be reset to a home position from which it will again move to gradually set up the proper pattern of energization of the heaters constituting the heating load, rather than imposing a possibly excessive sudden (slam) load on the power supply, such as might have been called for at the instant of power failure, if several or all of the heaters 44—50 had been energized at that time.

SAFETY INTERLOCKS AND RECYCLING

A branch conductor 78 from conductor 76 extends through one blade 80 of a double-pole single throw "on-off" switch 82 and thence through the recycle or reset contacts 38 of the step controller (see also FIG. 1) to a low water interlock signal or alarm or interlock 84. The transformer 86 energizes the coil of a relay 88 through a probe 90 normally conductively related to the body of water in the boiler or heater, so that the relay 88 is held energized unless there is a low water condition. The contacts of this relay, at 92, extend the safety circuit through a known series of contacts including for example a thermal high-limit control 94, a flow-sensing switch 96, a mechanical (float-type) low low water cutout 98, and ultimately a signal lamp 100. The coil of a reset relay 102 is connected across the signal lamp 100, and in the event of the failure of any of the interlock protection devices, the signal lamp will go off, and the relay 102 will drop out, discontinuing power supply to the heaters as well as requiring a reset operation of the equipment. It will be observed that the relay 102 is of the self-holding type, so that when it is released or deenergized, it cannot again be energized unless the recycle contacts 38 of the step controller (FIG. 1) are closed; that is, unless the followup motor has been brought to its home position.

PREHEAT OR WARMUP

The DPST switch 82 (when closed) brings power from transformer 62 over leads 76 and 78 to recycle switch 38 and (if the modulating motor is in its zero, home or full-off position) through the upper blade of switch 82 to a conductor 104 which leads through the cam switches (e.g., 30 and 32 in FIG. 1) which represent about 25 percent of the total number of such switches in the step controller or controllers employed. It will be understood that the showing of only 4 heaters and 4 cam switches in the drawings is for simplicity only, as in many installations a much larger number of heaters will be employed.

FIG. 3 of the drawings shows the circuit of the step controller assembly 40 to a larger scale, and as comprising a first multicontact section 40a, and second and third sections 40b and 40c, all driven from common shaft 28. Each section may contain a considerable number (up to 12 or more) of sequential cams and microswitches for the control of a large number of heaters, of which the four shown in the drawings are representative.

Thus, as described, conductor 78 provides the energization of about 25 percent of the total heater capacity, for preheat or warmup purposes, the warmup toggle switch 106 being open, as shown, when switch 106 is closed, a circuit is completed from supply line 76 through two of the contact sets of recycle relay 102 (or more contact sets, if required) and thence through additional cam-operated switches of the step controller 40 to energize additional heaters in sequence. The energization of these additional heaters is, of course, subject to the extent of closure of the remaining (approximately 75 percent) of the cam switches in step controller 40, under control of the modulating or proportional servo action of motor 10 and the condition-sensing controller 20.

MODULATION IN PROPORTION TO DEMAND

The manner in which the modulating control would operate, in the absence of the present invention, can be understood by imagining the 3 terminals R1, B1, W1 of condition-sensing control 20 to be connected directly to the 3 motor-control terminals R, B and W of the motor and relay unit 10, 22. The temperature bellows (for hot water system), or pressure bellows (for steam) would set the position of the sliding contact arm (R1) of control 20, and the motor 10 would drive step-controller shaft 28 to close (or open) the appropriate number of the cam-operated contacts thereof to raise (or lower) the number of heaters energized. Control would thus be established in accordance with the setting of 20, whose sensing element is exposed to the heating medium (steam or water), as described.

It follows from the above that if the heating medium is cold or cool (well below the setting of controller 20), the motor 10 will crank "full on," thereby establishing maximum power demand for the using customer, and this condition will continue until the temperature of the medium has been raised sufficiently to allow control 20 to reverse the motor as the desired ultimate temperature of the medium is reached. This heavy short term demand penalizes the using customer by the amount of the demand penalty in addition to the normal rate for KWH consumed. In a great percentage of installations, especially where summer reheating is used, or whenever BTU demand decreased with an increase in outside air temperature, this penalty is incurred needlessly, and can be avoided by artificially limiting the electrical power usage to certain limits for each of several ranges of outside temperature.

DEMAND-LIMITING FEATURE

For a purpose to be described later on, the demand-limiting control equipment incorporates a changeover relay whose coil 108 is energized from the secondary winding of transformer 78' through a thermostat 110, and the contact sets of which changeover relay operate to substitute, for the control 20, a different control 20'. Considering, for the moment, relay coil 108 to be in its deenergized state, the terminal block 112 of demand-limiting control 42 connects terminal W1 of control 20 via conductor 114 to the W terminal of servomotor 10, and also connects terminal R1 of control 20, via conductor 116 and the lowermost contact set 118 of recycle relay 102, to terminal R of motor 10. Operation of the servomotor in the direction tending to reduce the number of energized heaters (that is, in the "off" direction) is therefore normal. However, the terminal B1 of control 20 is connected from terminal block 112 over a conductor 120 to a manually settable variable resistance element 122, and thence through similar resistance elements 124 and 126 and conductor 128 to the B terminal of servomotor 10. It is this terminal B of the motor which controls its motion in the direction tending to increase the number of heaters that are energized, and hence the resistances 122, 124 and 126 serve to present to the servosystem a "false" signal tending to reduce or limit the amount of possible rotation of the motor in the load-increasing direction.

With all three of the adjustable limiting resistances included in the motor circuit, the artificially created demand limit will depend upon the respective settings of those resistances. Since it is desirable that the extent of demand-limiting be made to depend (in an inverse manner) upon the extent to which the temperature of the outside air falls below a predetermined (no-heat) target temperature (for example, 70° F.), provision is made for selectively inserting or removing these resistances in accordance with the range of outside temperatures encountered. For example, resistance 126 might be set (with a cold heat-transfer medium and minimum resistance setting in control 20) so as to limit the applied load to 25 percent of maximum, and resistance 124 set to limit the load to 50 percent, and resistance 122 set to limit the load to 75 percent. Other levels of maximum load limiting, and other temperature ranges, can of course be selected by the user, as dictated by the nature of the installation, operating experience, the demand penalty tariff, or other factors.

A typical and preferred way of making the extent of load-limiting depend upon the extent to which the outside temperature may be below the normal or target value (70°) at which little or no artificial heating would be required, involves the use of respective thermostatic contact elements 130, 132 and 134 placed so as to sense the outside temperature, and to close their contacts, in order, only when the outside temperature has dropped to or below (say) 60°, 45°, and 25°. These typical range temperatures are appropriate for the selected outside target temperature of, say, 70° or so. The actual settings of the thermostatic sensing devices are of course adjustable to suit conditions.

When any of these thermal switches does close, it provides a direct path from the left-hand end of its corresponding resistance (122, 124, or 126) to a common conductor 136 which leads to conductor 128 and thence to the motor terminal B, which controls the direction of the motor rotation for increasing loads. Therefore, if the call for heating results from only a moderate drop in the outside temperature (to not less than 60°), all of the range resistances remain in circuit and not more than 25 percent of the rated full load can be applied, because the "false" signal limits the rotation of motor 10 (and hence the closure of the cam-operated contacts of the step-controller 40) to that percentage of the heater units.

Similarly, a drop in outside temperature below 60° will result in contacts 130 closing and shunting resistance 126, to allow 50 percent of the heaters to be energized, and a further drop below 45° will close contacts 132 and allow 75 percent of the heater elements to be energized. Below 25°, energization of the entire heater installation is permitted, as all of the false-signal producing resistances will have been shunted out. It is obvious that this full load demand condition will occur only rarely; as a matter of fact, full demand can, if desired, be completely inhibited by a suitable setting of the last-to-close of the thermal switches. In any event, protection against excessive demand loads is attained except where the use of full electrical power is definitely required and justified.

As indicated previously, the control element 20 is operated by a bellows linkage responsive to temperature (or steam pressure) solely in the heat-transfer medium of the boiler installation. This is the preferred mode of control when the outside temperature remains at (say) 70° or above, and calls for heating result mainly from the use of hot water or process heating within the building. In winter, or whenever the outside air temperature may drop below 70°, it will be preferred to employ an alternate-mode control element 20' (FIG. 2-A) of the dual bulb type, one bulb sensing outside air temperature and the other bulb sensing the temperature of the heat-transfer medium (or the steam pressure). Relay 108 accomplishes this mode-changeover, the thermal element 110 being exposed to the outside air temperature and controlling the energization of the relay contacts 138 etc. at the terminal board 112, to substitute the control 20' for the control 20.

CALIBRATION AND CHECKING

Since the thermal sensing elements 110, 130, 132 and 134 are positioned remotely from the location of the control equipment, it is desirable to be able to simulate their closed-contact conditions artificially, so that the initial settings of the variable resistances (and/or the thermal shunting switches) can be carried out. This is accomplished by the manual shorting switches indicated at 140, 142, 144 and 146. Also, a manual switch 148 is provided which, when closed, shunts the R1 and B1 legs from the control 20 (or the R2, B2 legs from control 20') to eliminate the effect of any resistance present therein at the time of calibration.

It will be obvious to those skilled in the art that in a broad sense, the concept of this invention is not restricted to systems employing a servomotor or followup motor of the self-balancing type, so long as there is provided some control means whose input signals can be effectively limited in accordance with the extent of the severity of the demand for heat. Thus, energization of the immersion heaters, or other heating elements, can equally well be controlled by electronic devices such as controlled rectifiers or the like, such energization being limited, as taught above, by other means than limiting the rotation of a shaft or the like. These and other variations of the system disclosed are intended to be covered herein, to the extend extent that they fall within the language of the appended claims.

I claim:
1. A demand-limiting electrical-heating system for buildings or the like, comprising:
   a. a plurality of electrical-heating elements;
   b. A servomotor control including a condition-sensing device for generating a control signal related to the temperature of a heat-exchange fluid in heat-exchange relation to said heating elements, a followup motor connected for control by said condition-sensing device over a signal channel, and sequential contact-making means operated by said motor for energizing said heating elements in progressive sequence in accordance with the condition changes demanded by said condition-sensing device;
   c. A plurality of signal-limiting devices connected in said signal channel and all adapted to modify, by respectively different degrees, the maximum extent of movement of said motor in one direction in response to a given condition of said condition-sensitive device, so as to limit the energization of said heating elements to respectively different fractions of the total number thereof; and
   d. means responsive to decreases in the temperature of ambient air outside the building for sequentially disabling said signal-limiting devices, so as to selectively nullify their limiting effect as maximum heating demand conditions are approached.

2. A system in accordance with claim 1, in which said servomotor control includes a second condition-sensing device for generating a control signal related both to outside air temperature and to the temperature of the heat-exchange fluid; and means controlled by the temperature of the outside air for selectively connecting either the first-named, or the second, condition-sensing device to said signal channel.

3. A system in accordance with claim 1, in which said condition-sensing device comprises a potentiometer.

4. A system in accordance with claim 3, in which said followup motor includes a balancing potentiometer and a balancing relay for controlling the direction and extent of motion of said motor.

5. A system in accordance with claim 1, in which said signal-limiting devices comprise individual adjustable resistance elements.

6. A system in accordance with claim 1, in which said followup motor is constrained to drive itself in the homing direction for opening all of the sequential contacts of said contact-making means, upon interruption of the signal carried by said signal channel.

7. A system in accordance with claim 6, including a self-holding recycle relay having normally open contact pairs in series with the contacts of said contact-making means, and means responsive to the arrival of said followup motor in its home position for preparing a reenergizing circuit for said recycle relay.

8. A demand-limiting electrical heating system for buildings or the like, comprising:
   a. A plurality of electrical-heating elements;
   b. a condition-sensing device for generating a control signal related to the temperature of a heat-exchange fluid in heat-exchange relation to said heating elements, control means connected for control by said condition-sensing device over a signal channel, and sequential circuit-closing means operated by said control means for energizing said heating elements in progressive sequence in accordance with the condition changes demanded by said condition-sensing device;
   c. a plurality of signal-limiting divide connected in said signal channel and all adapted to modify, by respective different degrees, the maximum extent of activation of said control means in response to a given condition of said condition-sensitive device, so as to limit the energization of said heating elements to respectively different fractions of the total number thereof; and
   d. means responsive to decreases in the temperature of ambient air outside the building for sequentially disabling said signal-limiting devices, so as to selectively nullify their limiting effect as maximum heating demand conditions are approached.